(12) United States Patent
Shirakawa (10) Patent No.: US 7,812,761 B2
(45) Date of Patent: Oct. 12, 2010

(54) DSSS RADAR, METHOD IMPLEMENTED BY RADAR AND COMPUTER-READABLE STORAGE MEDIUM

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 12/076,058

(22) Filed: Mar. 13, 2008

(65) Prior Publication Data
US 2008/0316090 A1 Dec. 25, 2008

(30) Foreign Application Priority Data
Mar. 16, 2007 (JP) .............................. 2007-069344

(51) Int. Cl.
*G01S 13/08* (2006.01)
*G01S 13/58* (2006.01)
*G01S 13/00* (2006.01)

(52) U.S. Cl. ........................ 342/195; 342/104; 342/115; 342/189; 342/192

(58) Field of Classification Search ................. 342/104, 342/115, 189, 192, 195
See application file for complete search history.

(56) References Cited

U.S. PATENT DOCUMENTS

| | | | | |
|---|---|---|---|---|
| 3,812,493 A * | 5/1974 | Afendykiw et al. | .......... | 342/145 |
| 4,106,023 A * | 8/1978 | Baghdady | .................... | 342/405 |
| 4,568,940 A * | 2/1986 | Diamond | .................... | 342/149 |
| 4,608,566 A * | 8/1986 | Ennis et al. | ................... | 342/28 |
| 4,713,666 A * | 12/1987 | Poux | ........................... | 342/152 |
| 4,789,861 A * | 12/1988 | Baggett et al. | ............... | 342/152 |
| 4,958,161 A * | 9/1990 | Allezard | ...................... | 342/122 |
| 5,265,121 A * | 11/1993 | Stewart | ....................... | 375/346 |
| 5,736,956 A * | 4/1998 | Kennedy et al. | .............. | 342/90 |
| 5,995,207 A * | 11/1999 | Hall et al. | .................. | 356/5.09 |
| 6,567,777 B1 * | 5/2003 | Chatterjee | ................... | 704/246 |
| 6,885,968 B2 * | 4/2005 | Breed et al. | ................. | 702/143 |

OTHER PUBLICATIONS

Masahiro Watanabe, et al; "A 60,5 GHz Millimeter Wave Spread Spectrum Radar and the Test Data in Several Situations", Procedures on IEEE Intelligent Vehicle Symposium, 2002, pp. 87-91.

Jimming Xin and Akira Sano, "Computationally efficient subspacebased method for direction-of-arrival estimation without eigendecomposition", IEEE Trans. Signal Processing, vol. 52, No. 4, 2004, pp. 876-893.

J. Munier and G.Y.Delisle, "Spatial analysis using new properties of the cross-spectral matrix", IEEE Transactions on Signal Processing, vol. 39, No. 3, 1991, pp. 746-749.

* cited by examiner

*Primary Examiner*—Thomas H Tarcza
*Assistant Examiner*—Peter M Bythrow
(74) *Attorney, Agent, or Firm*—Hanify & King, P.C.

(57) ABSTRACT

A DSSS (Direct Sequence Spectrum Spreading) radar has a transmitting part to transmit a transmitting signal, including a predetermined code sequence, to one or a plurality of targets, a receiving part to receive a received signal corresponding to the transmitting signal which has been reflected from the one or a plurality of targets, and a computing part. The computing part computes a sum signal and a difference signal of received signals received by the receiving part at different points in time, and obtains a Doppler frequency of the one or a plurality of targets based on a phase difference between the sum signal and the difference signal.

20 Claims, 5 Drawing Sheets

DSSS RADAR, METHOD IMPLEMENTED BY RADAR AND COMPUTER-READABLE STORAGE MEDIUM

BACKGROUND OF THE INVENTION

1. Field of the Invention

The present invention generally relates to radars, and more particularly to a DSSS (Direct Sequence Spectrum Spreading) radar, a method implemented by a DSSS radar, and a computer-readable storage medium which stores a program for causing a computer to carry out such a method.

2. Description of the Related Art

Generally, the radar is also referred to as a radiolocater, and detects the position and velocity of a target by irradiating a radio wave with respect to the target and receiving and analyzing a reflected signal from the target. A description will be given of an example where the radar is used in a vehicle. The radar may be categorized into a LRR (Long Range Radar) and an SRR (Short Range Radar) depending on the distance between the radar and the target to be detected. The LRR detects the target within a relatively long range of 100 meters, for example, and mainly utilizes an FM (Frequency Modulation) technique. On the other hand, the SRR detects the target within a relatively short range of several tens of meters, for example, and utilizes the FM technique or an SS (Spectrum Spreading) technique. The SRR is expected to be used in various applications, including control of an airbag.

Figure 1:
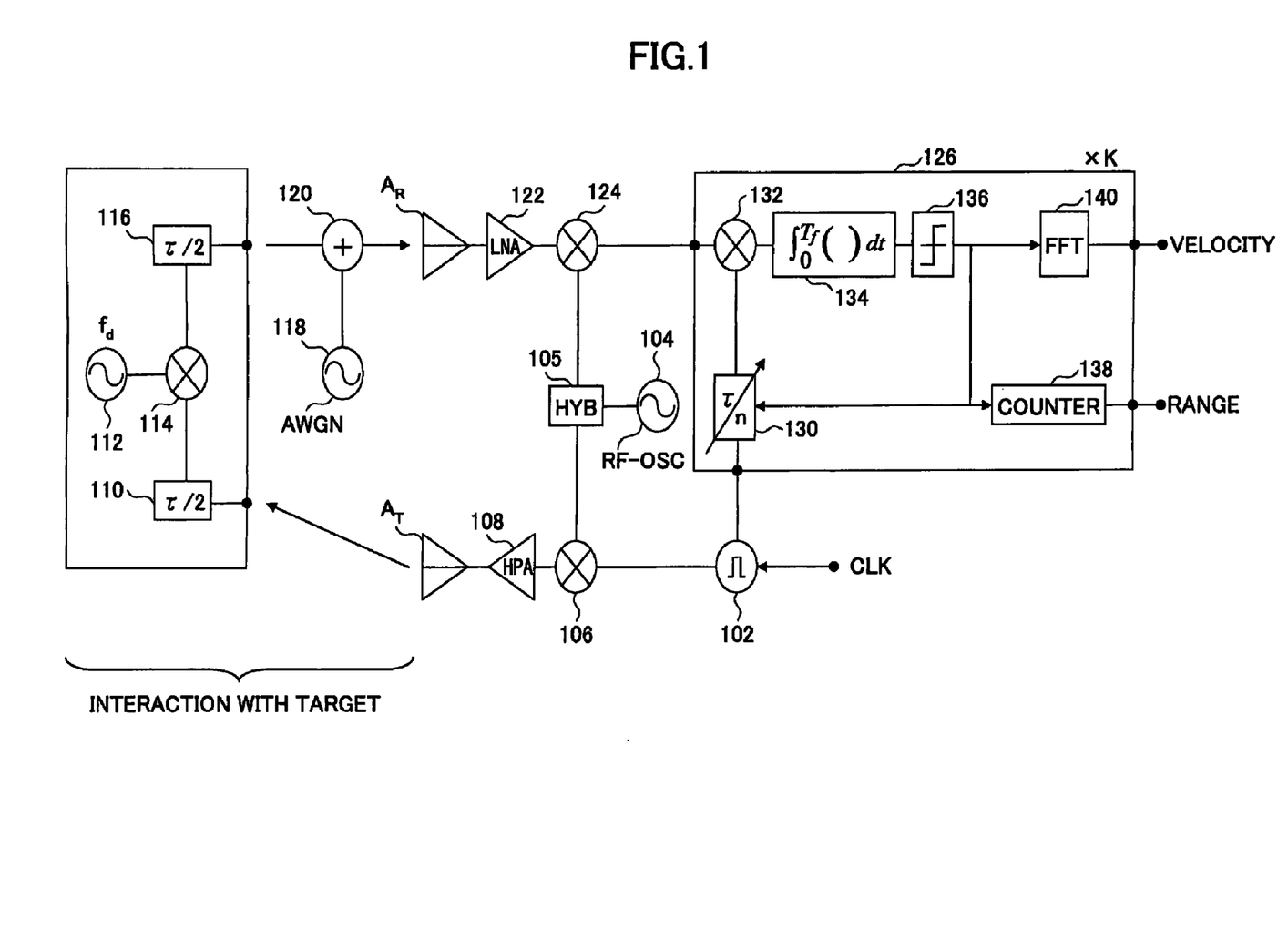
FIG. 1 is a system block diagram of a DSSS radar.

FIG. 1 is a system block diagram, that is, a simulation model, of a DSSS radar. The DSSS radar first generates a PN code having a suitable length and timing by a code generator 102, and uses this PN code as a system reference signal (or baseband signal) $v_{TX}(t)$ which characterizes the signal transmitted from this DSSS radar. The system reference signal $v_{TX}(t)$ can be represented by the following formula (1), where DN denotes a device number of the DSSS radar, N denotes the length of the PN code, p(t) denotes a pulse waveform carrying the code, and $T_c$ denotes a chip duration of the pulse. In FIG. 1, CLK denotes a clock.

$$v_{TX}(t) = \sum_{n=-\infty}^{\infty} c^{DN}_{mod(n,N)} p(t - nT_c) \tag{1}$$

The system reference signal $v_{TX}(t)$ is up-converted by a mixer 106 using a carrier signal which is generated by a high-frequency generator (or oscillator, RF-OSC) 104 and is branched by a distributor (or hybrid circuit) 105. The up-converted transmitting signal is amplified by a high-output amplifier or a HPA (High-Power Amplifier) 108, and is transmitted from a transmitting antenna $A_T$ as a probe signal. In other words, the probe signal is obtained by modulating the carrier signal by the system reference signal $v_{TX}(t)$. The probe signal is transmitted by, for example, a millimeter wave signal.

In the example shown in FIG. 1, the mutual interaction between the probe signal and the target can be represented by a propagation delay time τ, a Doppler frequency $f_d$, and an AWGN (Additive White Gaussian Noise). That is, if the target exists within an FOV (Field Of View) of the DSSS radar, the probe signal is received by the DSSS radar after receiving effects of the propagation delay time τ depending on a relative distance of the target from the radar in the direction of the line of sight (hereinafter simply referred to as a distance), the Doppler frequency $f_d$ depending on a relative velocity of the target in the direction of the line of sight (hereinafter simply referred to as a velocity), and the AWGN. In FIG. 1, reference numerals 110 and 116 denote τ/2 delays, a reference numeral 112 denotes the Doppler frequency $f_d$, a reference numeral 114 denotes a mixer, a reference numeral 118 denotes the AWGN, and a reference numeral 120 denotes an adder, to represent the mutual interaction between the probe signal and the target in simulation.

A received signal which is received by a receiving antenna $A_R$ is amplified by an LNA (Low Noise Amplifier) 122. The received signal after this amplification is down-converted by a mixer 124 using a carrier signal which is branched by the distributor 105, and the down-converted received signal is input to a mixer 132 of a baseband demodulator 126. The mixer 132 multiplies the down-converted received signal and the PN code (or SS code for demodulation) which is delayed by a delay time $\tau_n$ by a delay circuit 130. An output signal of the mixer 132 is integrated by an integrator 134 for a PN code period $T_f(=N*T_c)$, and a correlation value is output from the integrator 134. Accordingly, a baseband signal $v_{RX}(t)$ which is output from the mixer 132 can be represented by the following formula (2), where k (=1, ..., K) denotes a target number specifying a k-th target of K targets, $a_k$ denotes a signal amplitude, $\omega_d^k$ denotes a Doppler angular frequency, $\tau_k$ denotes a delay time, and n(t) denotes the AWGN (Additive White Gaussian Noise).

$$v_{RX}(t) = \sum_{k=1}^{K} a_k \exp[j\omega_d^k (t - \tau_k/2)] \tag{2}$$

$$\sum_{m=-\infty}^{\infty} \sum_{n=-\infty}^{\infty} c^{DN}_{mod(m,N)} c^{DN}_{mod(n,N)} p(t - nT_c - \tau_k) \times p(t - mT_c) + n(t)$$

Figure 2:
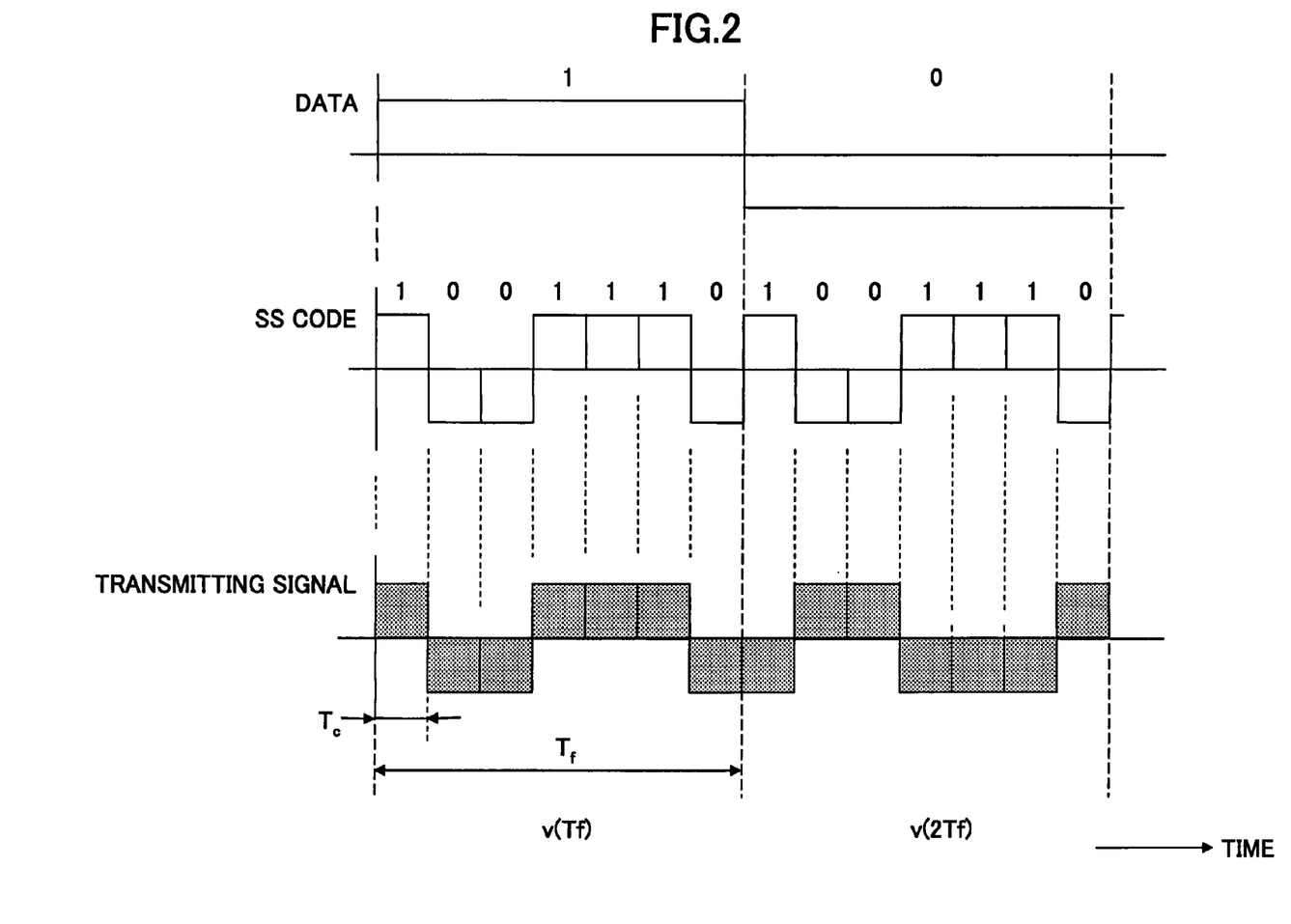
FIG. 2 is a diagram schematically showing a relationship of an SS code, a code period $T_f$ and a chip duration $T_c$.

FIG. 2 is a diagram schematically showing a relationship of the SS code, the code period $T_f$ and the chip duration $T_c$. In FIG. 2, the transmitting signal is illustrated as being a multiplication result of the data and the SS code, however, it is not essential for the data to be multiplied.

Figure 3:
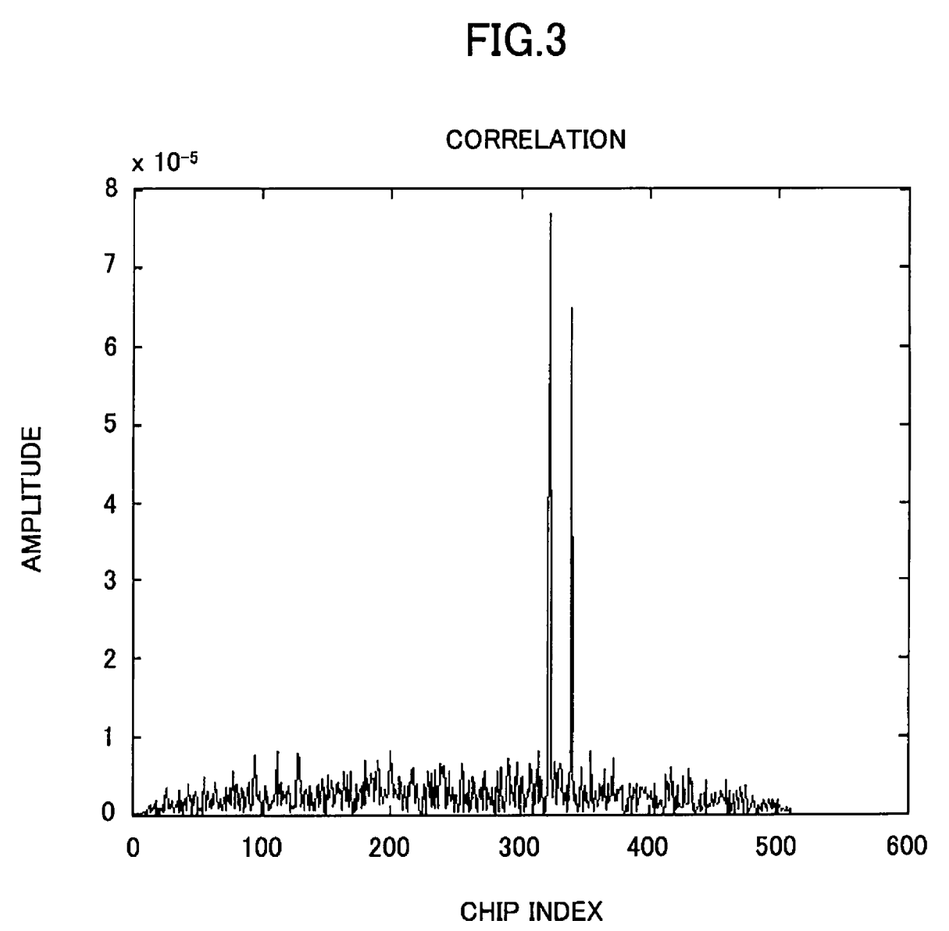
FIG. 3 is a diagram showing an example of a correlation output.

FIG. 3 is a diagram showing an example of a correlation output. In FIG. 3, the vertical axis indicates the correlation (the amplitude in arbitrary units), and the horizontal axis indicates the chip index. The correlation shown in FIG. 3 is obtained by plotting the output of the integrator 134 while setting the delay time $\tau_n$ of the delay circuit 130 to various values. The two sharp peaks in FIG. 4 indicate that at least two targets at different distances from the radar exist, and that the delay times τ of the two targets are approximately 320 chips and approximately 340 chips, respectively. A detector 136 shown in FIG. 1 detects the position (chip index) of such sharp peaks, and detection results of the detector 136 are supplied to the delay circuit 130 and a counter 138 as synchronization timings with respect to reflected signals from the two targets. In order to scan such sharp peaks for a predetermined time, the delay circuit 130 outputs the SS code to the mixer 132 while shifting the SS code by a predetermined multiple of one chip duration $T_c$, such as ⅓ the chip duration $T_c$, for example. Hence, the PN code having a predetermined delay time $mT_c$ is multiplied to the received signal in the mixer, and is integrated for the code period $T_f$ by the integrator 134. For example, when the received code from the k-th target and the demodulated code, including the delay, become synchronized, the summation corresponding to the k-th target in the latter half (summation on the indexes m and n) of the formula (2) becomes 1, and the received signal related to this target can be represented by the following formula (2A), where a component having a synchronization error becomes −1/N and substantially 0.

$$v_{RX}(t)=a_k\exp[j\omega d^k(t-\tau_k/2)]+n(t) \quad (2A)$$

When the sharp peak corresponding to the target is detected, the delay circuit 130 fixes its delay time to the value which results in the sharp peak (and the synchronization timing is detected), and the synchronization is secured for the target. If a plurality of targets exist (k=1, ..., K), the synchronization timing is detected for each target, and the above described process is carried out by the demodulator 126 in a similar manner for each of the synchronization timings. In FIG. 1, the symbol "x K" indicated above the demodulator 126 indicates that K demodulators 126 are provided in parallel, so as to facilitate the understanding of the operation. Of course, a single demodulator 126 may be used to time-divisionally carry out the above described process for each of the synchronization timings.

Next, the velocity or distance of the target from the radar is detected based on the synchronized received signal. If the velocity of light is denoted by c, a distance $d_k$ of the k-th target can be computed from the following formula. Accordingly, the resolution of the distance is proportional to the chip duration $T_c$.

$$d_k=(c\tau_k)/2\approx(cmT_c)/2$$

The received signal has a Doppler frequency depending on the velocity of the target. But because the radar is a radiolocator, it is not possible to know the Doppler frequency $f_d$ in advance. In other words, it is not possible to know the velocity of the target directly from the output signal of the integrator 134. Hence, according to the conventional technique, the received signal is sampled for a duration longer than or equal to a time $1/f_d$ ($=2\pi/\omega_d=T_d$) which is derived from the lowest predicted Doppler frequency $f_d$, and the sampled received signal (or reception sample) is subjected to a Fourier transform in an FFT (Fast Fourier Transform) circuit 140 in order to estimate the Doppler frequency $f_d$. This duration $T_d$ in which the received signal is sampled becomes longer as the Doppler frequency $f_d$ becomes lower.

For example, a system for estimating the Doppler frequency using the FFT circuit in the DSSS radar has been proposed in Masahiro Watanabe et al., "A 60.5 GHz Millimeter Wave Spread Spectrum Radar and the Test Data in Several Situations", Procedures on IEEE Intelligent Vehicle Symposium, 2002, pp. 87-91.

When the Doppler frequency $f_d$ is relatively low, the duration $T_d$ becomes relatively long. Since the velocity of the target may take various values which may be large or small, the conventional technique samples the received signal for a duration corresponding to the lowest relative velocity, for example, and estimates the Doppler frequency $f_d$ by processing the reception sample by the FFT circuit.

Figure 4:
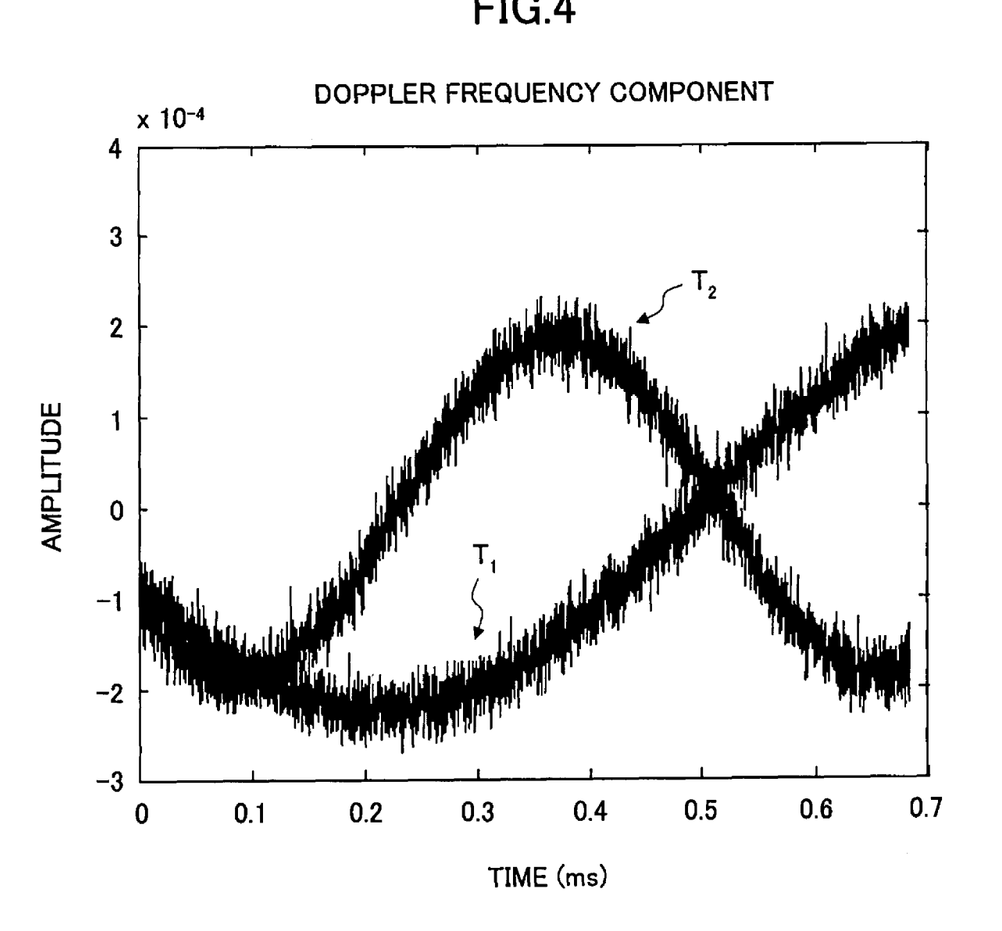
FIG. 4 is a diagram showing a state where a reception sample is continuously obtained for every code period $T_f$ for each of two targets.

FIG. 4 is a diagram showing a state where a reception sample is continuously obtained for every code period $T_f$ for each of two targets $T_1$ and $T_2$. In FIG. 4, the vertical axis indicates the amplitude of the Doppler signal component in arbitrary units, and the horizontal axis indicates the time (ms: milliseconds). FIG. 4 shows the reception sample after the baseband demodulation in an overlapping manner along the time base, for each of the two targets $T_1$ and $T_2$. Each reception sample is obtained for every integration time ($T_f$) of the integrator 134, and the integration time ($T_f$) is 0.0002 (ms) in FIG. 4. One target $T_1$ is located at a distance of 10 meters from the radar, and is moving at a velocity of 6 km/h. The other target $T_2$ is located at a distance of 11 meters from the radar, and is moving at a velocity of 12 km/h. In this case, it may be seen that the value of the reception sample changes at a period of approximately 0.7 (ms) for the target $T_2$. Accordingly, if the received signal is sampled for the duration of approximately 0.7 (ms) and the reception sample is subjected to the FFT, it is possible to obtain the Doppler frequency $f_d$ and the velocity of the target $T_2$. The received signal needs to be sampled for a duration longer than approximately 0.7 (ms) for the target $T_1$.

Particularly in the case of radars used in vehicles, the velocity of the near target must be estimated more quickly and more accurately from the point of view of providing safety. However, problems are encountered in the conventional technique which uses the FFT in a situation where a plurality of targets are moving at various velocities. That is, in a case where the traffic is heavy on the highway and the distance between the vehicles is extremely short, for example, the time it takes to detect the velocity of the slow-moving target may govern the time required to detect the fast-moving target. Accordingly, from the point of view of realizing a high-speed and highly accurate measurement, it is undesirable to employ the technique which measures the Doppler frequency based on the FFT which requires a long time to collect the data.

Theoretically, the received signal component is obtained for every integration time $NT_c$ ($=T_f$) that is necessary to demodulate the PN code. Hence, there is another conventional technique which estimates the Doppler frequency by focusing on this relationship. More particularly, after the received code from the k-th target is synchronized and $v_{RX}(t)=a_k\exp[j\omega d^k(t-\tau_k/2)]+n(t)$ is obtained for the baseband signal $v_{RX}(t)$ represented by the formula (2), this other conventional technique derives the Doppler frequency $f_d$ ($=\omega_d/2\pi$) from the value of the m-th sample of the samples that are obtained for every integration time $T_f$ according to the following formula (3), where $n_R(t)$ denotes a real part of the AWGN n(t) and $n_I(t)$ denotes an imaginary part of the AWGN n(t).

$$\omega_d^k \approx \frac{1}{(mT_f - \tau_k/2)}\tan^{-1}\frac{\text{Im}[v_{RX}^k(mT_f)]}{\text{Re}[v_{RK}^k(mT_f)]} \quad (3)$$

$$\frac{\text{Im}[v_{RX}^k(mT_f)]}{\text{Re}[v_{RK}^k(mT_f)]} = \frac{\tan[\omega_d^k(mT_f - \tau_k/2)] + n_I(mT_f)/a_k\cos[\omega_d^k(mT_f - \tau_k/2)]}{1 + n_R(mT_f)/a_k\cos[\omega_d^k(mT_f - \tau_k/2)]}$$

According to this other conventional technique, the Doppler angular frequency $\omega_d$ can be derived quickly in a case where the SNR (Signal-to-Noise Ratio) is large. However, because the formula (3) is greatly dependent upon the noise $n(t)=n_R(t)+jn_I(t)$ at a single point in time ($t=mT_f$), there is a possibility that the accuracy of the Doppler angular frequency $\omega_d$ will greatly deteriorate in a case where the SNR is poor at the point in time when the target is measured. In addition, in a case where $|mT_f-\tau_k/2| \rightarrow \pi/2\omega_d^k, 3\pi/2\omega_d^k, \ldots$, the accuracy of the Doppler angular frequency $\omega_d$ may greatly deteriorate due to the cosine function, in the denominator, of the argument of the arctangent function approaching zero or, the tangent function, in the numerator, infinitely diverging in the positive or negative direction. The accuracy of the Doppler angular frequency $\omega_d$ may also deteriorate when $|mT_f - \tau_k|/2| \to 0$.

SUMMARY OF THE INVENTION

Accordingly, it is a general object of the present invention to provide a novel and useful DSSS radar, method implemented by radar and computer-readable storage medium, in which the problems described above are suppressed.

Another and more specific object of the present invention is to provide a DSSS radar, a method implemented by a radar and a computer-readable storage medium, which can quickly and accurately estimate the Doppler frequency of the target object.

According to one aspect of the present invention, there is provided a DSSS (Direct Sequence Spectrum Spreading) radar comprising a transmitting part configured to transmit a transmitting signal, including a predetermined code sequence, to one or a plurality of targets; a receiving part configured to receive a received signal corresponding to the transmitting signal which has been reflected from said one or a plurality of targets; and a computing part configured to compute a sum signal and a difference signal of received signals received by the receiving part at different points in time, and to estimate a Doppler frequency of said one or plurality of targets based on a phase difference between the sum signal and the difference signal. According to the DSSS radar of the present invention, it is possible to quickly and accurately estimate the Doppler frequency of the target object.

According to another aspect of the present invention, there is provided a method implemented in a DSSS (Direct Sequence Spectrum Spreading) radar, comprising the steps of transmitting a transmitting signal, including a predetermined code sequence, to one or a plurality of targets; receiving a received signal corresponding to the transmitting signal which has been reflected from said one or a plurality of targets; and computing a sum signal and a difference signal of received signals obtained in the receiving step at different points in time, and estimating a Doppler frequency of said one or plurality of targets based on a phase difference between the sum signal and the difference signal. According to the method of the present invention, it is possible to quickly and accurately estimate the Doppler frequency of the target object.

According to another aspect of the present invention, there is provided a computer-readable storage medium which stores a program for causing a computer to function as a DSSS (Direct Sequence Spectrum Spreading) radar, said program comprising a transmitting procedure causing the computer to transmit a transmitting signal, including a predetermined code sequence, to one or a plurality of targets; a receiving procedure causing the computer to receive a received signal corresponding to the transmitting signal which has been reflected from said one or a plurality of targets; and a computing procedure causing the computer to compute a sum signal and a difference signal of received signals obtained by the receiving procedure at different points in time, and estimating a Doppler frequency of said one or plurality of targets based on a phase difference between the sum signal and the difference signal. According to the computer-readable storage medium of the present invention, it is possible to quickly and accurately estimate the Doppler frequency of the target object.

Other objects and further features of the present invention will be apparent from the following detailed description when read in conjunction with the accompanying drawings.

DESCRIPTION OF THE PREFERRED EMBODIMENTS

In one embodiment of the present invention, the DSSS radar (or radiolocator) has one or more transmitters for transmitting to one or more targets a probe signal which has been modulated by a suitable modulation technique, and one or more receivers for receiving the probe signal which is reflected from the one or more targets and for demodulating the received probe signal into a baseband signal. The DSSS radar further has a part for converting the baseband signal into a discrete signal sequence by sampling the baseband signal at time intervals sufficiently shorter than the time required for the angle and the velocity of the target in the direction of the line of sight to change. The DSSS radar also has a part for computing the Doppler frequency caused by the relative velocity of the target in the direction of the line of sight, from a phase transition of two or more samples of the discrete signal sequence at mutually different points in time.

In other embodiment of the present invention, a sum signal and a difference signal are generated from the baseband signal in two or more mutually different time slots which is sampled at a suitable time interval $\delta t$. The velocity of the target is computed by obtaining the Doppler frequency from a ratio of the sum signal and the difference signal evaluated by an inverse trigonometric function. Because only several samples at different points in time are required to obtain the Doppler angular frequency $\omega_d$ ($=2\pi f_d$), the Doppler frequency $f_d$ can be obtained very quickly. In addition, because the samples at the several different points in time are used, it is possible to avoid the destructive effects of the noise which may occur at only one point in time.

In still another embodiment of the present invention, vectors having the reception samples obtained at the different points in time as components thereof are provided, and the concept of the spatial average in the array signal processing and the concept of the propagator technique are employed. Hence, even if a plurality of targets moving at different velocities exist at similar distances from the radar, it is possible to accurately estimate the velocity of each target.

Of course, the different embodiments described in this specification do not necessarily have to be independent, and two or more embodiments may be arbitrarily combined depending on the requirements.

First Embodiment

Figure 5:
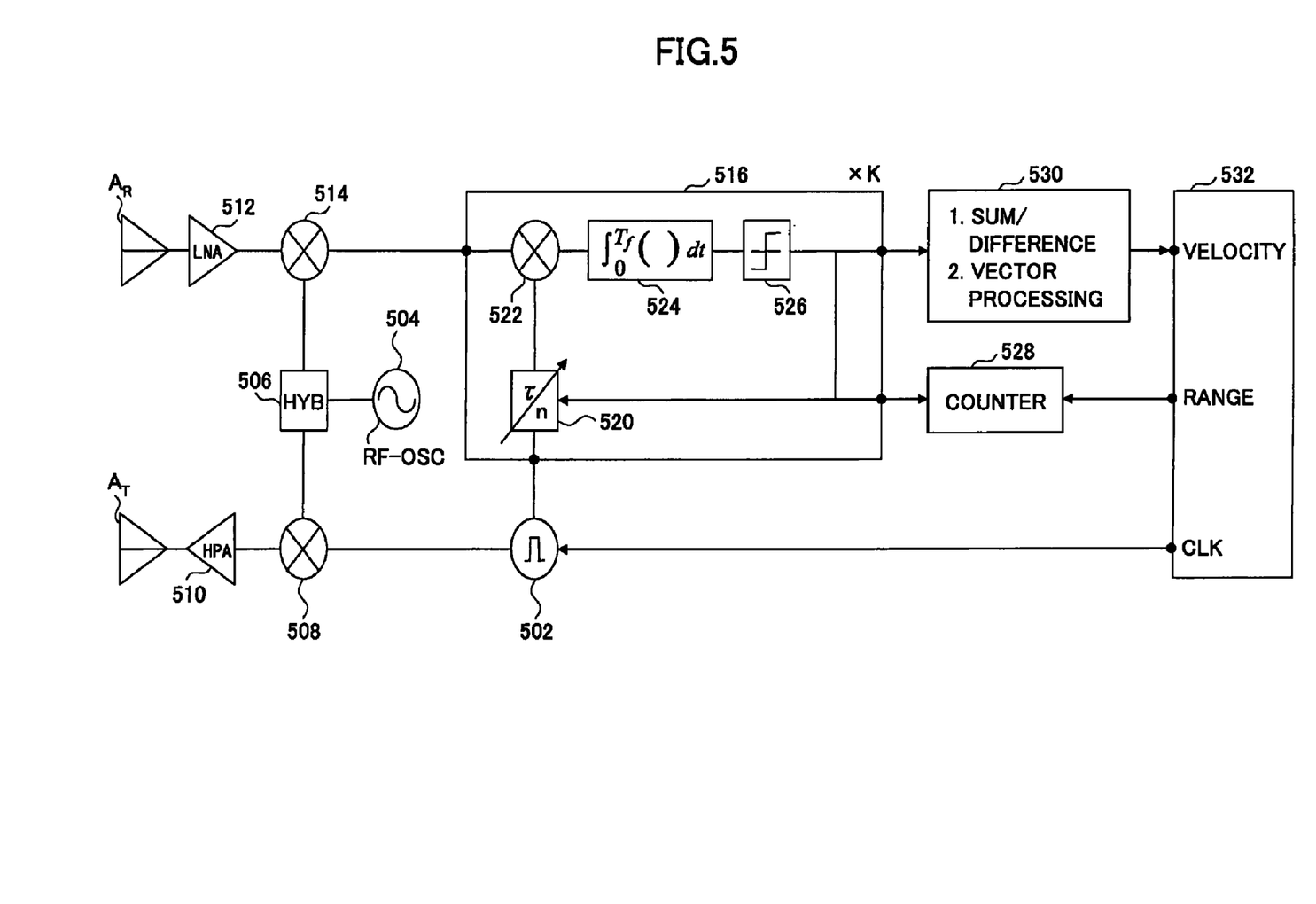
FIG. 5 is a block diagram showing a radar in an embodiment of the present invention.

FIG. 5 is a block diagram showing a radar in an embodiment of the present invention. The radar shown in FIG. 5 includes a code generator 502, an oscillator 504, a carrier distributor (or hybrid circuit) 506, a mixer 508, an HPA (High Power Amplifier) 510, an LNA (Low Noise Amplifier) 512, a mixer 514, a demodulator 516, a counter 528, a Doppler frequency estimator 530, and a control and signal processor 532. CLK denotes a clock.

The code generator 502 generates a predetermined code sequence forming a system reference signal. The predetermined code sequence may be any suitable code sequence usable for the spectrum spreading. For example, the PN code sequence, the M code sequence, the Gold code sequence and the like may be used as the predetermined code sequence. The code period of the predetermined code sequence may be set arbitrarily depending on the usage of the radar. From the point of view of suppressing the inter-code interference and improving the measuring accuracy, it is desirable to set the code period ($T_f$) long. From the point of view of improving the distance measuring accuracy, it is desirable to set the chip duration Tc short.

The oscillator 504 provides a carrier signal for carrying a probe signal. The carrier frequency is not limited to a particular frequency in this embodiment. For example, the carrier frequency may be set to various values, such as 76 GHz, 38 GHz and 24 GHz, depending on the usage of the radar.

The carrier distributor 506 supplies the carrier signal which is provided by the oscillator 504 to a transmitting end and a receiving end.

The mixer 508 multiples the code sequence generated by the code generator 502 and the carrier signal, and provides a transmitting signal. In other words, the carrier signal is modulated by the system reference signal, and the probe signal is provided.

The HPA 510 amplifies the power of the transmitting signal, and the amplified transmitting signal is transmitted from a transmitting antenna $A_T$.

A functional block including elements similar to the elements 110, 112, 114, 116, 118 and 120 shown in FIG. 1 is provided for simulation, to introduce a propagation delay τ, a Doppler frequency $f_d$ and a noise component such as the AWGN. However, the illustration of such a functional block, to represent the mutual interaction between the probe signal and the target in simulation, is omitted in FIG. 5 in order to simplify the drawing.

The LNA 512 suitably amplifies the power of a received signal.

The mixer 514 converts the high-frequency received signal into a suitable baseband signal.

The demodulator 516 includes a delay adjuster 520, a mixer 522, an integrator 524 and a peak detector 526. In FIG. 5, the symbol "x K" indicated above the demodulator 516 indicates that K (K=1, 2, . . . ) demodulators 516 may be provided in parallel, so as to facilitate the understanding of the operation. As described above, K denotes the total number of targets to be detected. A synchronization timing is used in each demodulator 516 for each target. Of course, it is not essential in this embodiment to provide K demodulators 516 in parallel. A single demodulator 516 may be used K times to carry out the above described process while varying the synchronization timing, so as to obtain the same results.

The delay adjuster 520 of the demodulator 516 adds a suitable delay with respect to the system reference signal, according to an instruction from the counter 528, to generate a code sequence for demodulation, such as the SS code. For example, the suitable delay added by the delay adjuster 520 is an integer multiple of the chip duration $T_c$.

The mixer 522 computes a product of the received signal (baseband signal) and the code sequence for demodulation.

The integrator 524 integrates the output of the mixer 522 for a predetermined time, which is typically one unit of the code sequence or $1T_f$. An integrated value obtained by the integrator 524 indicates a correlation value between the code sequence for demodulation generated by delaying the system reference signal and a baseband component of the received signal. The baseband signal includes the system reference signal which is delayed by a time corresponding to the distance from the radar to the target.

The peak detector 526 detects a peak of the correlation value exceeding a predetermined threshold value, and obtains a time position of the delay corresponding to the detected peak. In general, each peak corresponds to each target. As described above, by establishing synchronization and demodulating the received signal (baseband signal) by taking into consideration the delay time corresponding to the peak position of the correlation value generated for a certain target, it is possible to receive the reflected signal of this certain target by suitably separating only the reflected signal of this certain target from the reflected signals of the other targets.

The counter 528 carries out a control so that the delay time set by the delay adjuster 520 changes for a predetermined time. At the same time, the counter 528 sends to the control and signal processor 532 delay information indicating the delay time that is set at each point in time. The control and signal processor 532 utilizes this delay information from the counter 528 to compute the distance from the radar to the corresponding target when the peak of the correlation value is detected.

The Doppler frequency estimator 530 computes the Doppler frequency $f_d$ based on the received signal which is synchronized to each target, according to a technique described hereunder.

The control and signal processor 532 computes the distance from the radar to the target from the delay information with respect to the system reference signal which gives the correlation value the peak, and computes the velocity of the target based on the Doppler frequency $f_d$ which is computed by the Doppler frequency estimator 530.

Next, a description will be given of an operation of estimating the Doppler frequency $f_d$ by the Doppler frequency estimator 530. In order to simplify the description, it is assumed for the sake of convenience that only one target, which is a vehicle, for example, exists directly in front of the radar, and that the intensity of the received signal is normalized to 1. A DOA (Direction Of Arrival) of the probe signal which is reflected by the target is 0 degree when the target is directly in front of the radar. In a more complicated situation where a plurality of targets exist at the same distance from the radar, for example, a more accurate estimation is made as described later in conjunction with a second embodiment of the present invention. Because the number of receiving antennas and the number of demodulators are not limited in the embodiments of the present invention, it is possible for a transmitter and a receiver to share a single antenna in common or, the transmitter and the receiver may use different antennas.

The carrier signal generated from the oscillator (or high-frequency generator) 504 is modulated in the mixer 508 by the system reference signal that is provided by the code generator 502, and is transmitted via the HPA 510 and the transmitting antenna $A_T$ as the probe signal. The probe signal is reflected by the target and reaches the receiving antenna $A_R$. The probe signal which reaches the receiving antenna $A_R$ has the propagation delay τ with respect to the probe signal prior to the transmission, and has a frequency deviated by the Doppler frequency. The probe signal is also added with the AWGN n(t). The received signal is down-converted by the carrier signal in the mixer 514 and is converted into the baseband signal. The mixer 522 multiplies this baseband signal to the code for demodulation, which is generated by adding a delay to the system reference signal from the code generator 502 in the delay adjuster 520. The output of the mixer 522 is integrated by the integrator 524. By carrying out the multiplication in the mixer 522 and the integration in the integrator 524 while varying the delay time $\tau_n$ for a predetermined time, the correlation value that is output indicates a peak when the delay time from the radar to the target and the delay time set in the delay adjuster 520 match, to thereby establish the code synchronization.

In this state, the peak of the correlation value is detected by the peak detector 526, and the delay time which is set in the delay adjuster 520 when the peak occurs is supplied to the control and signal processor 532 via the counter 528. Thereafter, the reflected signal from the target is demodulated in the state where the code synchronization is established, and the received signal is input to the Doppler frequency estimator 530. Basically, this received signal that is input to the Doppler frequency estimator 530 is a sinusoidal signal having the Doppler frequency $f_d$ corresponding to the velocity of the target.

Of the samples indicating the received signal, two samples having a suitable time interval $\delta t$ are input to the Doppler frequency estimator 530. These two samples at sampling times $t_1$ and $t_2$ can be represented by the following formulas (4) and (5), where $t_2 = t_1 + \delta t$. The time interval $\delta t$ may be set to an arbitrary value, and for example, may be set to an integer multiple of the code period $T_f$. Further, the time interval $\delta t$ may be defined as being a sufficiently short time compared to the time in which the angle of the line of sight to the target and the velocity of the target in the direction of the line of sight change.

$$v(t_1) = \exp(j\omega_d t_1) + n(t_1) \tag{4}$$

$$v(t_2) = \exp(j\omega_d t_2) + n(t_2) \tag{5}$$

Next, the Doppler frequency estimator 530 computes a ratio between the sum and the difference between the samples $v(t_1)$ and $v(t_2)$ according to the following formula (6).

$$\frac{v(t_2) - v(t_1)}{v(t_2) + v(t_1)} = \frac{\exp[j\omega_d(t_1 + \delta t/2)]\left[\begin{array}{c}\exp(j\omega_d \delta t/2) - \\ \exp(j\omega_d \delta t/2)\end{array}\right] +}{\exp[j\omega_d(t_1 + \delta t/2)]\left[\begin{array}{c}\exp(j\omega_d \delta t/2) + \\ \exp(j\omega_d \delta t/2)\end{array}\right] +} \tag{6}$$
$$= \frac{j\tan(\omega_d \delta t/2) + \Delta n}{1 + \Sigma n}$$

In the formula (6), $\Delta n$ and $\Sigma n$ are quantities that are defined by the following set of formulas (7).

$$\Delta n = \frac{n(t_2) - n(t_1)}{2\exp[j\omega_d(t_1 + \delta t/2)]\cos(\omega_d \delta t/2)}, \tag{7}$$

$$\Sigma n = \frac{n(t_2) + n(t_1)}{2\exp[j\omega_d(t_1 + \delta t/2)]\cos(\omega_d \delta t/2)}$$

Accordingly, by setting the values so that $|\delta t|$ takes a value sufficiently separated from an odd integer multiple of $\pi/2\omega_d$, that is, $\cos(\omega_d \delta t/2)$ does not become 0 and $\tan(\omega_d \delta t/2)$ does not diverge, the Doppler angular frequency $\omega_d$ which is dependent upon the velocity of the target can be obtained from the following formula (8) in a case where the SNR is sufficiently large.

$$\omega_d \approx \frac{2}{\delta t}\tan^{-1}\left\{imag\left[\frac{v(t_2) - v(t_1)}{v(t_2) + v(t_1)}\right]\right\} \tag{8}$$

Generally, the accuracy of the arctangent function $\tan^{-1}(x)$ becomes poor when $|x| > \pi/2$. For this reason, it is possible to monitor the value of $|\omega_d \delta t/2|$, and use the formula (8) when $|\omega_d \delta t/2| \leq \pi/4$ and to use the following formula (9) when $|\omega_d \delta t/2| > \pi/4$.

$$\omega_d \approx \frac{2}{\delta t}\cot^{-1}\left\{imag\left[\frac{v(t_2) + v(t_1)}{v(t_2) - v(t_1)}\right]\right\} \tag{9}$$

However, since $\omega_d$ is unknown, it is necessary to take into consideration the fact that the switching point of the appropriate function to be used may vary depending on the target. Accordingly, from this point of view, it is also possible to use a linear combination represented by the following formula (10).

$$\omega_d \approx \frac{1}{\delta t}\left\{\begin{array}{l}\alpha\tan^{-1}\left\{imag\left[\frac{v(t_2) - v(t_1)}{v(t_2) + v(t_1)}\right]\right\} + \\ (1 - \alpha)\cot^{-1}\left\{imag\left[\frac{v(t_2) + v(t_1)}{v(t_2) - v(t_1)}\right]\right\}\end{array}\right\} \tag{10}$$

In the formula (10), a parameter $\alpha$ denotes a coupling (or combination) coefficient which may be a fixed value or a variable. Alternatively, $\gamma$ may be used as the argument of the arctangent function in the formula (8) described above, by setting $\gamma$ to $\gamma \equiv imag((v(t_2)-v(t_1))/(v(t_2)+v(t_1)))$, and providing two threshold values $th_1$ and $th_2$. The function to be used may be switched by using the formula (8) if $\gamma < th_1$, using the formula (9) if $th_2 < \gamma$, and using the formula (10) if $th_1 \leq \gamma \leq th_2$.

In the case described above, only two reception samples (instantaneous values) at the sampling times $t_1$ and $t_2$ are used. However, from the point of view of improving the SNR, it is possible to use, as the samples $v(t_1)$ and $v(t_2)$, average values of the two signal sequences that are independently obtained for every $\delta t$ from the mutually different sampling times $t_1$ and $t_2$ according to the following formulas (11) and (12). The number of samples to be used for the averaging may be set depending on the quality (SNR state etc.) of the received signals so that a stable value is obtainable, and may be set to several hundred, for example.

$$v(t_1) = \sum_m \exp[j\omega_d(t_1 + m\delta t)] + \sum_m n(t_1 + m\delta t) \tag{11}$$

$$v(t_2) = \sum_m \exp[j\omega_d(t_2 + m\delta t)] + \sum_m n(t_2 + m\delta t) \tag{12}$$

The Doppler angular frequency $\omega_d$ is derived from the arctangent function or the arccotangent function in the case described above. However, it is not essential to derive the Doppler angular frequency $\omega_d$ from the arctangent function or the arccotangent function, and other functions may be used according to the relationship of the trigonometric function. For example, the Doppler angular frequency $\omega_d$ may be derived from the arcsine function, as in the case of the following formula. In the following formula, $\beta$ denotes a correction coefficient which is determined in advance using such as the method of least squares so that the accuracy of the estimated value improves.

$$\omega_d = \frac{2}{\delta t}\sin^{-1}\left\{\frac{\beta\gamma}{\sqrt{1+\gamma^2}}\right\}; \gamma = \text{Im}\left(\frac{v(t_2)-v(t_1)}{v(t_2)+v(t_1)}\right)\bigg/\text{Re}\left(\frac{v(t_2)-v(t_1)}{v(t_2)+v(t_1)}\right)$$

When computing the inverse trigonometric function described above, it is possible to make the computation according to an approximation formula using Taylor expansion. Alternatively, from the point of view of making the computation at a high speed with a high accuracy, the computation may be made according to an approximation formula using Pade expansion.

In a case where a plurality of targets exist, the Doppler frequency of each of the targets may be estimated according to a predetermined priority order. For example, an estimating means to estimate a distance between the radar (radiolocator) and each target is provided, and the priority order is determined based on the positional relationship of the radar and each target estimated by the estimating means.

According to this embodiment, it is only necessary to use the samples obtained at two different points in time, at minimum, in order to obtain the Doppler angular frequency $\omega_d$ ($=2\pi f_d$), and the Doppler frequency $f_d$ can be obtained very quickly. In addition, because the samples at the two different points in time are used, it is possible to avoid the destructive effects of the noise which may frequently occur when a sample at only one point in time is used. Moreover, because the argument of the cosine function appearing in the denominator of $\Delta n$ and $\Sigma n$ is $\omega_d \delta t/2$, it is possible to easily avoid the computation accuracy from deteriorating due to the cosine function in the denominator approaching 0, by setting $\delta t$ so that $\omega_d \delta t/2$ does not become equal to an odd integer multiple of $\pi/2$.

NUMERICAL EXAMPLES

In order to confirm the effects of the first embodiment, the present inventor conducted simulations under the following conditions.
  1 Chip Duration (Te)=$3.9 \times 10^{-10}$ s (seconds)
  Code Length=9 Bits
  1 Frame Interval ($T_f$)=$2.0 \times 10^{-7}$ s (seconds)
  Distance To First Target ($T_1$)=10 m
  Velocity Of First Target ($T_1$)=6 km/h
  Distance To Second Target ($T_2$)=11 m
  Velocity Of Second Target ($T_2$)=12 km/h The correlation output for the reflected signals from each of the targets is obtained as shown in FIG. 3, and the received signal after the establishing synchronization is obtained as shown in FIG. 4. In order to derive the Doppler frequency $f_d$ by applying the conventional technique, the FFT, to such transmitting and received signals, 3431 frames were required to derive the Doppler frequency $f_d$ for the second target $T_2$. 3431 of the frames amount to a considerably long time of $3431 \times 2.0 \times 10^{-7} = 0.68 \times 10^{-3}$ s. In addition, because the first target $T_1$ is slower, an even longer time was required to derive the Doppler frequency $f_d$. On the other hand, according to the first embodiment, only 300 of frames were required to accurately obtain the velocity of the first target $T_1$ as 5.77 km/h and the velocity of the second target $T_2$ as 12.03 km/h. In other words, the first embodiment only required a relatively short time of $300 \times 2.0 \times 10^{-7} = 0.06 \times 10^{-3}$ s to derive the Doppler frequency $f_d$ of the first and second targets $T_1$ and $T_2$, and the computation time was reduced to less than $1/10$ that required for the conventional technique. In principle, the first embodiment can obtain the Doppler frequency $f_d$ of the targets in a short time corresponding to an even smaller number of frames than 300 of frames.

Second Embodiment

According to the technique employed in the DSSS radar of the first embodiment described above, the velocity of the target is estimated after identifying the distance between the radar and the target. For this reason, if a plurality of targets are located at the same distance from the radar, it is not easy to estimate the velocity of each target while distinguishing the targets. It is conceivable to use the FFT, for example, but the use of the FFT is undesirable from the point of view of quickly making the measurements. Hence, a second embodiment of the present invention employs a technique which can suitably derive the Doppler frequency $f_d$ even when a plurality of targets (number of targets is assumed to be $N_S$) are located at the same distance from the radar. The technique employed in this embodiment may be used as an auxiliary technique to the technique employed by the first embodiment in the Doppler frequency estimator 530 shown in FIG. 5.

First, a suitable time is set as a starting point, and the samples are acquired time-sequentially at $N_A$ different points in time. By assigning numbers n ($=1, \ldots, N_A$) to the samples in the acquired sequence, each sample v(n) can be represented by the following formula (13), where am denotes the amplitude of the reflected signal from the m-th target (m=1, . . . , $N_S$), and a phase $\phi_{n,m}$ is represented by the following formula (14).

$$v(n) = \sum_{m=1}^{N_S} a_m \exp(j\phi_{n,m}) + n[(n-1)T_f] \tag{13}$$

$$v_n \equiv v(n) = \sum_{m=1}^{N_S} a_m \exp(j\phi_{n,m}) + n[(n-1)T_f]$$

$$\phi_{n,m} \equiv \omega_d^m (n-1)T_f. \tag{14}$$

The $N_A$ reception samples may be represented as the following $N_A$-dimensional vector (15).

$$v = \begin{bmatrix} v_1 \\ \vdots \\ v_{N_A} \end{bmatrix} = \begin{bmatrix} \sum_{m=1}^{N_S} a_m \exp(j\omega_{1,m}) + n[0T_f] \\ \vdots \\ \sum_{m=1}^{N_S} a_m \exp(j\phi_{N_A,m}) + n[(N_A-1)T_f] \end{bmatrix} = Ax + n \tag{15}$$

In the $N_A$-dimensional vector (15), a matrix A, an amplitude vector x and a noise vector n are defined by the following formulas (16), (17) and (18).

$$A \equiv \begin{bmatrix} a(\omega^1), \ldots, \\ a(\omega^{N_S}) \end{bmatrix} = \begin{bmatrix} \exp(j\phi_{1,1}) & \cdots & \exp(j\phi_{1,N_S}) \\ \vdots & \ddots & \vdots \\ \exp(j\phi_{N_A,1}) & \cdots & \exp(j\phi_{N_A,N_S}) \end{bmatrix} \tag{16}$$

-continued $$x \equiv [a_1 \ \ldots \ a_{N_S}]^T \quad (17)$$

$$n \equiv \{n[0T_f] \ \ldots \ n[(N_A-1)T_f]\}^T \quad (18)$$

The received signal received by the radar has a high coherency, and the pseudo-covariance matrix may be computed by taking this property of the received signal into consideration. For example, a technique utilizing the pseudo-covariance matrix is proposed in Jinming Xin and Akira Sano, "Computationally efficient subspace-based method for direction-of-arrival estimation without eigendecomposition", IEEE Trans. Signal Processing, Vol. 52, No. 4, 2004, pp. 876-893.

First, correlation vectors $r_{v1}$ and $r_{v2}$ of the baseband signal are computed from the set of formulas (19). For the sake of simplicity, it is assumed that $N_P=N_S$. In the set of formulas (19), E indicates obtaining an expected value (average value), and "*" indicates obtaining a complex conjugate (that is, the complex conjugate is obtained for each element in a case where a target of "*" is a vector or a matrix).

$$r_{v1}=E[vv_{N_A}^*]$$

$$r_{v2}=E[vv_1^*] \quad (19)$$

Next, components of the correlation vectors $r_{v1}$ and $r_{v2}$ are rearranged to form matrixes $R_{f1}$ and $R_{f2}$ represented by the following formula (20). And matrixes $R_{b1}$ and $R_{b2}$ are formed from the matrixes $R_{f1}$ and $R_{f2}$ as in the formulas (21).

$$R_{f1} = \begin{pmatrix} r_{v1}^T(1) \\ \vdots \\ r_{v1}^T(N_A - N_P) \end{pmatrix}, \ R_{f2} = \begin{pmatrix} r_{v2}^T(2) \\ \vdots \\ r_{v2}^T(N_A - N_P + 1) \end{pmatrix} \quad (20)$$

$$R_{b1} = J_{N_A-N_P} R_{f2}^* J_{N_P}, \ R_{b2} = J_{N_A-N_P} R_{f1}^* J_{N_P} \quad (21)$$

In the formulas (20), a suffix "T" denotes a transpose. In the formulas (21), $J_N$ represents a N-dimensional anti-diagonal matrix having anti-diagonal, elements that are 1 and all other elements that are 0.

By making some computations, taking into account the following formula (22), etc., it may be seen that $R_{f1}=AX$ stands, for example.

$$r_{v1} = E \begin{pmatrix} v_k v_{N_A}^* \\ \vdots \\ v_{k+N_P-1} v_{N_A}^* \end{pmatrix}; k = 1, \ldots, N_A - N_P \quad (22)$$

By defining the matrix R by arranging the four matrixes $R_{f1}$ through $R_{b2}$ according to the following formula (23), it may be seen that the matrix R has the same information as a covariance matrix applied with a spatial average, as is we known (R is called a pseudo-covariance matrix). For the sake of convenience, this process will be referred to as an m-fbss process.

$$R=(R_{f1}R_{f2}R_{b1}R_{b2}) \quad (23)$$

In this second embodiment of the present invention, the matrix R that is obtained in this manner is segmented into an $N_P \times 4N_P$ matrix $R_1$ and an $(N_A-2N_P) \times 4N_P$ matrix $R_2$, to compute $(RR^H)^{-1}$, where the suffix "H" denotes a conjugate transpose. From the theorem of inverse matrixes, $(RR^H)^{-1}$ can be rewritten as shown in the following formula (24) by setting A (this A is of course different from the A defined in the formula (16)), B and D to $A=R_1R_1^H$, $B=R_1R_2^H$ and $D=R_2R_2^H$.

$$(RR^H)^{-1} = \left[ \begin{pmatrix} R_1 \\ R_2 \end{pmatrix} \begin{pmatrix} R_1^H & R_2^H \end{pmatrix} \right]^{-1} \quad (24)$$

$$= \begin{bmatrix} R_1R_1^H & R_1R_2^H \\ R_2R_1^H & R_2R_2^H \end{bmatrix}^{-1}$$

$$\equiv \begin{bmatrix} A & B \\ B^H & D \end{bmatrix}^{-1}$$

$$= \begin{bmatrix} A^{-1} & 0 \\ 0 & 0 \end{bmatrix} + QS^{-1}Q^H$$

In the formula (24), a scale matrix S and a projection matrix Q are defined by the following formulas (25) and (26). In the formula (26), I denotes an $(N_A-2N_P)$-dimensional unit matrix.

$$S = D - B^H A^{-1} B \quad (25)$$

$$Q = \begin{bmatrix} A^{-1}B \\ -I \end{bmatrix} \quad (26)$$

A pseudo-spectrum $P(\omega)$ can be defined by the following formula (27) using the $(RR^H)^{-1}$ which is derived as described above.

$$P(\omega) = \frac{a^H(\omega)a(\omega)}{a^H(\omega)[RR^H]^{-1}a(\omega)} \quad (27)$$

In the formula (27), $a^H(\omega)$ denotes the conjugate transpose of a phase vector similar to that appearing in the formula (16), where $\omega$ denotes the angular frequency. By varying (or scanning) the value of the phase vector $a(\omega)$ for a predetermined numerical range, the value of the pseudo-spectrum also varies. In a case where the phase angle $\omega$ is near the Doppler angular frequency $\omega_d$, a peak appears in the pseudo-spectrum. Accordingly, by monitoring the characteristic change in the pseudo-spectrum while scanning the phase vector $a(\omega)$, it is possible to derive the Doppler angular frequency $\omega_d$. Alternatively, the Doppler angular frequency $\omega_d$ may be obtained by solving an algebraic equation which is derived by setting the denominator of the right term of the formula (27) to 0.

The first term of the formula (24) includes an inverse matrix of the matrix A corresponding to the information of the signal subspace itself. Because the basis for the peak appearing in the pseudo-spectrum is that an orthogonal relationship stands between the signal subspace and the noise subspace, a slight deterioration may occur in the accuracy of the Doppler frequency $f_d$ that is obtained.

Hence, it is possible to subtract from the left term of the formula (24) a matrix which includes a partial matrix $A^{-1}$ and a zero matrix, that is, to utilize $QS^{-1}Q^H$. In this case, it is possible to improve the accuracy of the Doppler frequency $f_d$ that is obtained by using the formula (29) in place of the formula (27). This may be regarded as a propagator technique which searches the peak in the pseudo-spectrum that is defined by replacing $(RR^H)^{-1}$ in the formula (27) by $QQ^H$, and is improved by introducing a scale matrix S. For example, the propagator technique is proposed in J. Munier and G. Y. Delisle, "Spatial analysis using new properties of the cross-spectral matrix", IEEE Transactions on Signal Processing, Vol. 39, No. 3, 1991, pp. 746-749.

More particularly, the second term $QS^{-1}Q^H$ appearing in the rightmost term of the formula (24) is used in place of $(RR^H)^{-1}$ in the formula (27), so as to define a new pseudo-spectrum by the formula (29) and search for the peak in a similar manner described above. The formula (28) is an SVD (Singular Value Decomposition) representation of $S^{-1}$, where $\sigma_i$ denotes an inverse of the signal power and $e_i$ denotes an eigenvector.

$$S^{-1} = E \sum E^H = \sum \sigma_i e_i e_i^H \quad (28)$$

$$P(\omega) = \frac{a^H(\omega)a(\omega)}{a^H(\omega)QS^{-1}Q^H a(\omega)} = \frac{a^H(\omega)a(\omega)}{\sum \sigma_i |a^H(\omega)Qe_i|^2} \quad (29)$$

No corresponding signal component exists at a frequency position that is not in a vicinity of the Doppler frequency $f_d$, and hence, $R_1 \approx 0$ and $R_2 \approx 0$. Accordingly, $S \approx 0$ regardless of the phase information, that is, S asymptotically approaches to a singular matrix. In other words, $a^H(\omega)Qe_i \approx$ constant. In addition, since no signal component exists, $\sigma_i$ becomes extremely large, and $P(\omega)$ becomes small.

In the vicinity of the Doppler frequency $f_d$, $R_2 \approx (A^{-1}B)^H R_1$ stands, and S approximately becomes a singular matrix. At the same time, $a^H(\omega)Q$ also becomes approximately 0 (vector, in general) by the propagator technique, and $\sigma_i$ becomes small because the signal component exists. As a result, a peak appears in $P(\omega)$. In other words, at the frequency other than the true Doppler frequency $f_d$, a pseudo-peak virtually does not appear. In addition, because of the scaling effect of $S^{-1}$, the peak corresponding to the Doppler frequency $f_d$ appears in an extremely sharp manner. Consequently, it is possible to obtain the Doppler frequency $f_d$ with a high accuracy.

In addition, it is necessary to know the accurate value of $N_P$ in order to properly divide R. But the $N_P$ value may be estimated by using techniques like AIC and MDL those include the SVD, or by checking the characteristic of the matrix related to the matrix R, such as the norm of $RR^H$.

In each of the embodiments described above, each procedure or process carried out by the DSSS radar may be realized by a computer. In this case, a program, which may be stored in a computer-readable storage medium, causes the computer to function as the DSSS radar and to carry out the procedures or processes of the DSSS radar.

This application claims the benefit of a Japanese Patent Application No. 2007-069344 filed Mar. 16, 2007, in the Japanese Patent Office, the disclosure of which is hereby incorporated by reference.

Further, the present invention is not limited to these embodiments, but various variations and modifications may be made without departing from the scope of the present invention.

What is claimed is:

1. A DSSS (Direct Sequence Spectrum Spreading) radar comprising:
    a transmitting part configured to transmit a transmitting signal, including a predetermined code sequence, to one or a plurality of targets;
    a receiving part configured to receive a received signal corresponding to the transmitting signal which has been reflected from said one or a plurality of targets; and
    a computing part configured to compute a sum signal and a difference signal of received signals received by the receiving part at different points in time, and to estimate a Doppler frequency of said one or plurality of targets based on a phase difference between the sum signal and the difference signal.

2. The DSSS radar as claimed in claim 1, wherein the different points in time are separated by a time amounting to one or more period of the predetermined code sequence.

3. The DSSS radar as claimed in claim 1, wherein the computing part estimates the Doppler frequency by setting an imaginary part of a value, which is obtained by dividing the difference signal by the sum signal, to an argument of an arctangent function.

4. The DSSS radar as claimed in claim 1, wherein the computing part estimates the Doppler frequency by setting an imaginary part of a value, which is obtained by dividing the sum signal by the difference signal, to an argument of an arccotangent function.

5. The DSSS radar as claimed in claim 1, wherein the computing part estimates the Doppler frequency by a linear combination of an arctangent function having an argument set to an imaginary part of a value, which is obtained by dividing the difference signal by the sum signal, and an arccotangent function having an argument set to an imaginary part of a value, which is obtained by dividing the sum signal by the difference signal.

6. The DSSS radar as claimed in claim 1, wherein each of the received signals received at the different points in time is derived by averaging a plurality of reception samples.

7. The DSSS radar as claimed in claim 1, further comprising:
    a deriving part configured to compute a correlation between the received signal and the predetermined code sequence, and to derive a synchronization timing for each of said one or plurality of targets.

8. The DSSS radar as claimed in claim 7, wherein the computing part computes the sum signal and the difference signal of received signals received by the receiving part at different points in time, with respect to each of said one or plurality of targets, and estimates a Doppler frequency of each of said one or plurality of targets based on the phase difference between the sum signal and the difference signal.

9. The DSSS radar as claimed in claim 3, wherein the computing part estimates the Doppler frequency by computing an inverse trigonometric function, having an argument set to an imaginary part of a value which is obtained by dividing the difference signal by the sum signal or, by dividing the sum signal by the difference signal, by means of Pade expansion.

10. The DSSS radar as claimed in claim 1, wherein the computing part comprises:
    a first computing part configured to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;
    a second computing part configured to form a pseudo-covariance matrix R applied with a spatial average by combining the correlation vectors $r_{v1}$ and $r_{v2}$; and
    a third computing part configured to compute the Doppler frequency from an algebraic equation or a pseudo-spectrum using $(RR^H)^{-1}$.

11. The DSSS radar as claimed in claim 1, wherein the computing part comprises:
    a first computing part configured to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;

a second computing part configured to form a pseudo-covariance matrix R applied with a spatial average by combining the correlation vectors $r_{v1}$ and $r_{v2}$;

a third computing part configured to estimate a number $N_S$ of arriving signals;

a fourth computing part configured to form a projection matrix Q from the pseudo-covariance matrix R depending on the number $N_S$;

a fifth computing part configured to compute a scale matrix S from a partial matrix of the pseudo-covariance matrix R; and a sixth computing part configured to compute the Doppler frequency from an algebraic equation or a pseudo-spectrum using a matrix which is generated from an arbitrary combination of the projection matrix Q and the scale matrix S, including $QS^{-1}Q^H$.

12. The DSSS radar as claimed in claim 1, wherein the computing part comprises:

a first computing part configured to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;

a second computing part configured to form a pseudo-covariance matrix R applied with a spatial average by combining the correlation vectors $r_{v1}$ and $r_{v2}$;

a third computing part configured to form a projection matrix Q from the pseudo-covariance matrix R depending on a number $N_S$ of arriving signals which is set in advance;

a fourth computing part configured to compute a scale matrix S from a partial matrix of the pseudo-covariance matrix R; and a fifth computing part configured to compute the Doppler frequency from an algebraic equation or a pseudo-spectrum using a matrix which is generated from an arbitrary combination of the projection matrix Q and the scale matrix S, including $QS^{-1}Q^H$.

13. The DSSS radar as claimed in claim 1, further comprising:

an estimating part configured to estimate a distance from the DSSS radar to said one or a plurality of targets, wherein the computing part computes the Doppler frequency based on a priority order of estimating the distance, which is determined from a relative relationship between the DSSS radar and said one or a plurality of targets.

14. A method implemented in a DSSS (Direct Sequence Spectrum Spreading) radar, comprising the steps of:

transmitting a transmitting signal, including a predetermined code sequence, to one or a plurality of targets;

receiving a received signal corresponding to the transmitting signal which has been reflected from said one or a plurality of targets; and computing a sum signal and a difference signal of received signals obtained in the receiving step at different points in time, and estimating a Doppler frequency of said one or a plurality of targets based on a phase difference between the sum signal and the difference signal.

15. The method as claimed in claim 14, wherein the different points in time are separated by a time amounting to one or more period of the predetermined code sequence.

16. A computer-readable storage medium which stores a program for causing a computer to function as a DSSS (Direct Sequence Spectrum Spreading) radar, said program comprising:

a transmitting procedure causing the computer to transmit a transmitting signal, including a predetermined code sequence, to one or a plurality of targets;

a receiving procedure causing the computer to receive a received signal corresponding to the transmitting signal which has been reflected from said one or a plurality of targets; and a computing procedure causing the computer to compute a sum signal and a difference signal of received signals obtained by the receiving procedure at different points in time, and estimating a Doppler frequency of said one or a plurality of targets based on a phase difference between the sum signal and the difference signal.

17. The computer-readable storage medium as claimed in claim 16, wherein the different points in time are separated by a time amounting to one or more period of the predetermined code sequence.

18. The computer-readable storage medium as claimed in claim 16, wherein the computing procedure includes:

a first computing procedure causing the computer to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;

a second computing procedure causing the computer to form a pseudo-covariance matrix R applied with a spatial average by combining the correlation vectors $r_{v1}$ and $r_{v2}$; and a third computing procedure causing the computer to compute the Doppler frequency from an algebraic equation or a pseudo-spectrum using $(RR^H)^{-1}$.

19. The computer-readable storage medium as claimed in claim 16, wherein the computing procedure includes:

a first computing procedure causing the computer to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;

a second computing procedure causing the computer to form a pseudo-covariance matrix R applied with a spatial average by combining the correlation vectors $r_{v1}$ and $r_{v2}$;

a third computing procedure causing the computer to estimate a number $N_S$ of arriving signals;

a fourth computing procedure causing the computer to form a projection matrix Q from the pseudo-covariance matrix R depending on the number $N_S$;

a fifth computing procedure causing the computer to compute a scale matrix S from a partial matrix of the pseudo-covariance matrix R; and a sixth computing procedure causing the computer to compute the Doppler frequency from an algebraic equation or a pseudo-spectrum using a matrix which is generated from an arbitrary combination of the projection matrix Q and the scale matrix S, including $QS^{-1}Q^H$.

20. The computer-readable storage medium as claimed in claim 16, wherein the computing procedure includes:

a first computing procedure causing the computer to compute correlation vectors $r_{v1}$ and $r_{v2}$ from a vector $v=(v(t_1), \ldots, v(t_N))^T$ which is formed from samples of received signals at mutually different times $t_1, \ldots, t_N$ and the received signals at the mutually different times $t_1, \ldots, t_N$;

a second computing procedure causing the computer to form a pseudo-covariance matrix R applied with a spatial average by combining the correlation vectors $r_{v1}$ and $r_{v2}$;

a third computing procedure causing the computer to form a projection matrix Q from the pseudo-covariance matrix R depending on a number $N_S$ of arriving signals which is set in advance;

a fourth computing procedure causing the computer to compute a scale matrix S from a partial matrix of the pseudo-covariance matrix R; and a fifth computing procedure causing the computer to compute the Doppler frequency from an algebraic equation or a pseudo-spectrum using a matrix which is generated from an arbitrary combination of the projection matrix Q and the scale matrix S, including $QS^{-1}Q^H$.

* * * * *